United States Patent Office.

ROBERT SIM, OF NAPLES.

Letters Patent No. 92,757, dated July 20, 1869; patented in England, August 12, 1868.

IMPROVED COMPOSITION FOR PREVENTING THE FOULING OF SHIPS' BOTTOMS.

The Schedule referred to in these Letters Patent and making part of the same.

To all whom it may concern:

Be it known that I, ROBERT SIM, of Naples, a subject of the Queen of Great Britain, have invented or discovered new and useful "Improvements in Compositions for Preventing the Fouling of Ships' Bottoms, and other buildings exposed to the action of sea or impure water;" and I, the said ROBERT SIM, do hereby declare the nature of the said invention, and in what manner the same is to be performed, to be particularly described and ascertained in and by the following statement thereof; that is to say—

This invention has for its object improvements in compositions for preventing the fouling of ships' bottoms, and other buildings exposed to the action of sea-water; and consists in employing, in the manufacture of such compositions, compounds or mixtures of iodine and mercury, but I take, by preference, the compound of iodine and mercury known as red iodide of mercury.

Before applying such compositions to the bottoms of iron ships, or other metallic surfaces to be protected, I first well clean the surface to be covered, and then apply two or more coatings of a mixture composed of two gallons boiled linseed-oil, half a gallon of spirits of turpentine, seventy pounds of red lead, and fourteen pounds of white lead. Afterwards, when these coatings are dry, I apply one or more coatings of a mixture composed of one and a half gallon boiled linseed-oil, half a gallon spirits of turpentine, sixty-five pounds of red lead, and fifteen pounds of the red iodide of mercury, or a mixture of this and the other iodides of mercury.

I have found the before-mentioned proportions of the several ingredients answer best under ordinary circumstances, but I do not confine myself to these proportions only. Where great rapidity of drying is required, a varnish may be employed, made of some resinous or bituminous substance, dissolved in a suitable menstruum, to which is added the red iodide of mercury, in the proportion of one pound of the red iodide to one pint of varnish. I prefer, however, a mixture of boiled oil, spirits of turpentine, red lead, and the mercury compound, as given above.

What I claim as my invention of improvements in compositions for preventing the fouling of ships' bottoms, and other buildings exposed to the action of sea or impure water, is—

The combination, in such compositions, of compounds or mixtures of iodine and mercury, by preference, the red iodide of mercury, as herein described.

Also, the compound consisting of red iodide of mercury, red lead, boiled linseed-oil, and turpentine, as herein described.

ROBT. SIM.

Witnesses:
G. F. WARREN, } Both of No. 17 Gracechurch
THOS. BROWN, } Street, London.